US008710777B2

(12) United States Patent
Tian

(10) Patent No.: US 8,710,777 B2
(45) Date of Patent: Apr. 29, 2014

(54) METHOD FOR AUTOMATICALLY ESTIMATING INERTIA IN A MECHANICAL SYSTEM

(75) Inventor: Gang Tian, Westlake, OH (US)

(73) Assignee: Linestream Technologies, Cleveland, OH (US)

( * ) Notice: Subject to any disclaimer, the term of this patent is extended or adjusted under 35 U.S.C. 154(b) by 0 days.

(21) Appl. No.: 13/451,924

(22) Filed: Apr. 20, 2012

(65) Prior Publication Data

US 2013/0278196 A1 Oct. 24, 2013

(51) Int. Cl.
  *H02P 21/14* (2006.01)
(52) U.S. Cl.
  USPC .......... 318/400.1; 318/58; 318/646; 318/460; 318/638; 318/456; 702/41; 73/511
(58) Field of Classification Search
  USPC .............................. 318/646, 460, 638, 58, 457
  See application file for complete search history.

(56) References Cited

U.S. PATENT DOCUMENTS

| | | | |
|---|---|---|---|
| 3,543,010 A | 11/1970 | Dahlin | |
| 3,786,242 A | 1/1974 | Brooks | |
| 3,826,887 A | 7/1974 | Pemberton | |
| 4,481,567 A | 11/1984 | Kaya et al. | |
| 4,540,923 A * | 9/1985 | Kade et al. | 318/561 |
| 4,768,143 A | 8/1988 | Lane et al. | |
| 5,159,254 A | 10/1992 | Teshima | |
| 5,229,699 A | 7/1993 | Chu et al. | |
| 5,602,347 A * | 2/1997 | Matsubara et al. | 73/862.193 |
| 5,684,375 A | 11/1997 | Chaffee et al. | |
| 5,742,503 A | 4/1998 | Yu | |
| 6,037,736 A * | 3/2000 | Tsuruta et al. | 318/609 |
| 6,122,555 A | 9/2000 | Lu | |
| 6,128,541 A | 10/2000 | Junk | |
| 6,198,246 B1 | 3/2001 | Yutkowitz | |
| 6,294,755 B1 | 9/2001 | Sawatzky et al. | |
| 6,445,962 B1 | 9/2002 | Blevins et al. | |

(Continued)

FOREIGN PATENT DOCUMENTS

| | | |
|---|---|---|
| EP | 0827265 | 4/2002 |
| JP | 2002-023807 | 1/2002 |

(Continued)

OTHER PUBLICATIONS

Aaron, "Synthesis of Feedback Control Systems by Means of Pole and Zero Location of the Closed Loop Function". AIEE Transactions, 1951, vol. 70, 8 pages.

(Continued)

*Primary Examiner* — Eduardo Colon Santana
*Assistant Examiner* — Bickey Dhakal
(74) *Attorney, Agent, or Firm* — Amin, Turocy & Watson, LLP

(57) ABSTRACT

Systems and methods for estimating an inertia and a friction coefficient for a controlled mechanical system are provided. In one or more embodiments, an inertia estimator can generate a torque command signal that varies continuously over time during a testing sequence. The velocity of a motion system in response to the time-varying torque command signal is measured and recorded during the testing sequence. The inertia estimator then estimates the inertia and/or the friction coefficient of the motion system based on the torque command data sent to the motion system and the measured velocity data. In some embodiments, the inertia estimator estimates the inertia and the friction coefficient based on integrals of the torque command data and the velocity data.

20 Claims, 12 Drawing Sheets

(56) References Cited

U.S. PATENT DOCUMENTS

| | | | |
|---|---|---|---|
| 6,495,791 B2 | 12/2002 | Hunter et al. | |
| 6,510,353 B1 | 1/2003 | Gudaz et al. | |
| 6,546,295 B1 | 4/2003 | Pyotsia, et al. | |
| 6,564,194 B1 | 5/2003 | Koza et al. | |
| 6,611,125 B2 * | 8/2003 | Nagata et al. | 318/727 |
| 6,631,299 B1 | 10/2003 | Patel et al. | |
| 6,658,305 B1 | 12/2003 | Gudmundsson et al. | |
| 6,980,869 B1 | 12/2005 | Chandhoke | |
| 7,024,253 B2 | 4/2006 | Gaikwad et al. | |
| 7,149,591 B2 | 12/2006 | Gao et al. | |
| 7,289,915 B2 * | 10/2007 | Ide | 702/41 |
| 7,346,402 B1 | 3/2008 | Stahl | |
| 7,449,857 B2 | 11/2008 | Ohta et al. | |
| 7,865,254 B2 | 1/2011 | Gahinet et al. | |
| 8,041,436 B2 | 10/2011 | Gao | |
| 8,060,340 B2 | 11/2011 | Gao et al. | |
| 8,146,402 B2 | 4/2012 | Collins et al. | |
| 2003/0139825 A1 | 7/2003 | Lund | |
| 2005/0034538 A1 * | 2/2005 | Rehm et al. | 73/862.08 |
| 2007/0073422 A1 | 3/2007 | Gaikwad et al. | |
| 2007/0088448 A1 | 4/2007 | Mylaraswamy et al. | |
| 2008/0203960 A1 * | 8/2008 | Golownia et al. | 318/646 |

FOREIGN PATENT DOCUMENTS

| | | |
|---|---|---|
| JP | 2006-333570 | 12/2006 |
| JP | 2009-184095 | 8/2009 |
| JP | 2011-072178 | 4/2011 |
| KR | 10-1121474 | 1/2012 |
| WO | 0041043 A1 | 7/2000 |

OTHER PUBLICATIONS

Gao, et al., "A Novel Motion Control Design Approach Based on Active Disturbance Rejection". Proceedings of the 40th IEEE Conference on Decision and Control, Orlando, Florida USA, Dec. 2001, 0-7803-7061-9/01 (c)2001 IEEE, 6 pages.

Ghanekar, et al., "Scaling Laws for Frequency Domain Controllers of Dynamically Equivalent Single Flexible Link Manipulators". IEEE International Conference on Robotics and Automation, 0-7803-1965-6/95 (c)1995 IEEE, 6 pages.

Ghanekar, et al., "Scaling Laws for Linear Controllers of Flexible Link Manipulators Characterized by Nondimensional Groups". IEEE Transactions on Robotics and Automation, vol. 13, No. 1, Feb. 1997, 1042-296X/97 (c)1997 IEEE, 11 pages.

Suh, et al., "New PID Identification Algorithm Based on Frequency Scaling", 0-7803-3694-1/97 (c)1997 IEEE, 5 pages.

U.S. Office Action for U.S. Appl. No. 10/351,664 mailed on Sep. 8, 2006.

U.S. Office Action for U.S. Appl. No. 10/351,664 mailed on May 1, 2007.

U.S. Office Action for U.S. Appl. No. 10/351,664 mailed on Nov. 14, 2007.

U.S. Office Action for U.S. Appl. No. 10/351,664 mailed on Nov. 21, 2008.

U.S. Office Action for U.S. Appl. No. 10/351,664 mailed on Jul. 31, 2009.

U.S. Office Action for U.S. Appl. No. 10/351,664 mailed on Apr. 12, 2010.

U.S. Office Action for U.S. Appl. No. 10/351,664 mailed on Mar. 3, 2011.

International Search Report and Written Opinion dated Oct. 11, 2013 for International Application No. PCT/US13/37122, 30 pages.

* cited by examiner

METHOD FOR AUTOMATICALLY ESTIMATING INERTIA IN A MECHANICAL SYSTEM

TECHNICAL FIELD

This disclosure generally relates to motion control, and specifically to estimation of inertias and friction coefficients for use as parameters in a motion control system.

BACKGROUND

Many automation applications employ motion control systems to control machine position and speed. Such motion control systems typically include one or more motors or similar actuating devices operating under the guidance of a controller, which sends position and speed control instructions to the motor in accordance with a user-defined control algorithm. Some motion control systems operate in a closed-loop configuration, whereby the controller instructs the motor to move to a target position or to transition to a target velocity (a desired state) and receives feedback information indicating an actual state of the motor. The controller monitors the feedback information to determine whether the motor has reached the target position or velocity, and adjusts the control signal to correct errors between the actual state and the desired state.

Designers of motion control systems seek to achieve an optimal trade-off between motion speed and system stability. For example, if the controller commands the motor to transition a mechanical component to a target position at a high torque, the machine may initially close the distance between the current position and the desired position at high speed (and thus in a time-efficient manner), but is likely to overshoot the desired position because of the high torque. Consequently, the controller must apply a corrective signal to bring the machine back to the desired position. It may take several such iterations before the motion system converges on the desired position, resulting in undesired machine oscillations. Conversely, instructing the motor to move at a lower torque may increase the accuracy of the initial state transition and reduce or eliminate machine oscillation, but will increase the amount of time required to place the machine in the desired position. Ideally, the controller gain coefficients should be selected to optimize the trade-off between speed of the state transition and system stability. The process of selecting suitable gain coefficients for the controller is known as tuning.

The response of a controlled mechanical system to a signal from a controller having a given set of controller gain coefficients depends on physical characteristics of the mechanical system, including the inertia and the friction coefficient. The inertia represents the resistance of the motion system to acceleration or deceleration. The friction coefficient represents a friction seen by the motor, such as the friction between the rotor and the shaft. Accurate estimates for the inertia and friction coefficient of a controlled mechanical system can simplify the tuning process and improve performance of the system. However, identifying accurate values for these parameters for a given mechanical system can be difficult. In some cases, the inertia is estimated using manual calculations based on the rated motor data and physical data (weight, dimensions, etc.) of the components comprising the load. Such calculations can be cumbersome and time consuming, and may not yield accurate values for these important parameters.

The above-described is merely intended to provide an overview of some of the challenges facing conventional motion control systems. Other challenges with conventional systems and contrasting benefits of the various non-limiting embodiments described herein may become further apparent upon review of the following description.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its purpose is to present some concepts of one or more embodiments in a simplified form as a prelude to the more detailed description that is presented later.

One or more embodiments of the present disclosure relate to systems and methods for automatically estimating inertia and friction coefficients for controlled mechanical systems. To this end, an inertia estimating system can instruct a controller to send a torque control signal to a motor, where the torque control signal varies continuously over time between defined maximum and minimum torque values. This torque control signal can be controlled based on a testing sequence defined in the inertia estimating system. In a non-limiting example, the testing sequence can specify that the torque control signal will increase gradually at a defined rate of increase, causing the motor to accelerate. In response to a defined trigger, the torque control signal can gradually decrease back to zero, causing the motor to decelerate to a rest state.

During these acceleration and deceleration phases, the inertia estimating system can measure and record the velocity of the motor over time in response to the torque control signal. An inertia component can then determine one or both of an estimated inertia and an estimated friction coefficient for the mechanical system based on the time-varying torque signal and the measured velocity curve. The estimated inertia and/or the friction coefficient can subsequently be used by the controller to facilitate identification of appropriate controller gains for the system.

The following description and the annexed drawings set forth herein detail certain illustrative aspects of the one or more embodiments. These aspects are indicative, however, of but a few of the various ways in which the principles of various embodiments can be employed, and the described embodiments are intended to include all such aspects and their equivalents.

DETAILED DESCRIPTION

Figure 1:
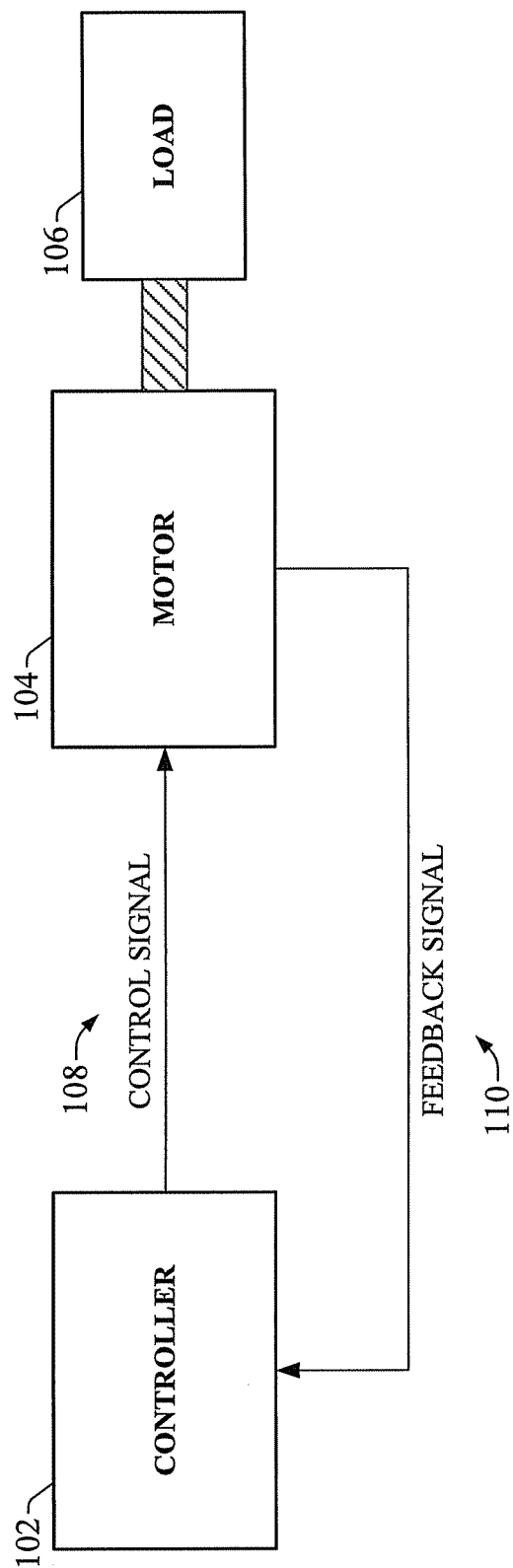
FIG. 1 is a block diagram of a simplified closed-loop motion control architecture.

Various embodiments are now described with reference to the drawings, wherein like reference numerals refer to like elements throughout. In the following description, for the purposes of explanation, numerous specific details are set forth in order to provide an understanding of this disclosure. It is to be understood, however, that such embodiments may be practiced without these specific details, or with other methods, components, materials, etc. In other instances, structures and devices are shown in block diagram form to facilitate describing one or more embodiments.

Systems and methods described herein relate to techniques for generating estimated inertia and friction coefficients for controlled mechanical systems. One or more embodiments of the present disclosure can estimate these parameters in a substantially automated fashion by running the mechanical system through a testing sequence to be defined in more detail herein. Results of this testing sequence can be used to generate accurate inertia and friction coefficient estimates for the system. These estimated parameters can subsequently be used to facilitate simplified and accurate tuning and control of the motion system.

FIG. 1 depicts a simplified closed-loop motion control architecture. Controller 102 is programmed to control motor 104, which drives mechanical load 106. Controller 102, motor 104, and load 106 comprise the primary components of an exemplary motion control system. In an exemplary non-limiting application, load 106 can represent an axis of a single- or multi-axis robot or positioning system. In such applications, controller 102 sends control signal 108 instructing the motor 104 to move the load 106 to a desired position at a desired speed. The control signal 108 can be provided directly to the motor 104, or to a motor drive (not shown) that controls the power delivered to the motor 104 (and consequently the speed and direction of the motor). Feedback signal 110 indicates a current state (e.g., position, velocity, etc.) of the motor 104 and/or load 106 in substantially real-time. In servo-driven systems, feedback signal 110 can be generated, for example, by an encoder or resolver (not shown) that tracks an absolute or relative position of the motor. In sensorless systems lacking a velocity sensor, the feedback signal can be provided by a speed/position estimator. During a move operation, the controller monitors feedback signal 110 to ensure that the load 106 has accurately reached the target position. The controller 102 compares the actual position of the load as indicated by the feedback signal 110 with the target position, and adjusts the control signal 108 as needed to reduce or eliminate error between the actual and target positions.

In another exemplary application, load 106 can represent a spinning load (e.g., a pump, a washing machine, a centrifuge, etc.) driven by motor 104, in which controller 102 controls the rotational velocity of the load. In this example, controller 102 provides an instruction to motor 104 (via control signal 108) to transition from a first velocity to a second velocity, and makes necessary adjustments to the control signal 108 based on feedback signal 110. It is to be appreciated that the parameter estimation techniques of the present application are not limited to use with the exemplary types of motion control systems described above, but are applicable for any suitable motion control application.

The control signal output generated by the controller 102 in response to an error between the desired position or velocity and the target position or velocity (as reported by the feedback signal 110) depends on the gain coefficients for the control loop. Design engineers must often employ a trial-and-error approach to identifying suitable gain coefficients (i.e. tuning the control loop), since suitable gain selection depends on physical characteristics of the mechanical system being controlled. For example, mechanical systems with a high inertia (resistance to acceleration or deceleration) may require relatively high initial torque to initiate a move to a new position or velocity, particularly if the application requires rapid convergence on the target position/velocity. However, high torque commands increase the possibility of overshoot, necessitating a reverse correction to bring the system back to the target. Non-optimal gain settings can result in undesired mechanical oscillations as the system performs multiple corrective iterations before settling on the target position or velocity. Such oscillations can introduce instability, cause system delays, and consume excessive power as a result of the additional work required to bring the system to a stable state. The friction of the motor can also affect how the mechanical system responds to a given control signal, and is therefore a factor to be considered when tuning the control system.

Control system tuning can be simplified if accurate estimates of the mechanical system's inertia and friction coefficient are known. Knowledge of these parameters can also improve performance of the system during operation. Accordingly, one or more embodiments of the present application can accurately estimate a controlled mechanical system's inertia and friction coefficient in a substantially automated fashion.

Figure 2:
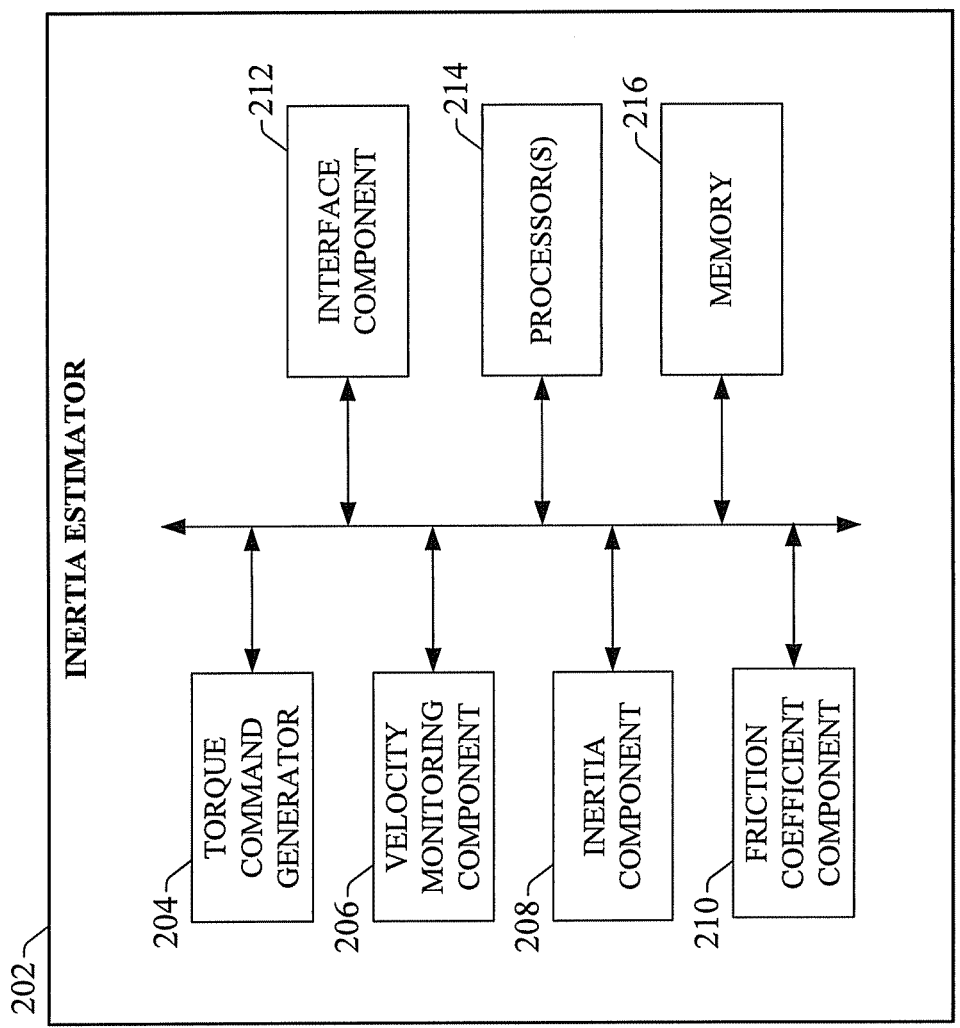
FIG. 2 is a block diagram of an exemplary non-limiting inertia estimating system.

FIG. 2 is a block diagram of an exemplary non-limiting inertia estimating system capable of generating estimated values of a mechanical system's inertia and friction coefficient. Inertia estimator 202 can include a torque command generator 204, a velocity monitoring component 206, an inertia component 208, a friction coefficient component 210, an interface component 212, one or more processors 214, and memory 216. In various embodiments, one or more of the torque command generator 204, velocity monitoring component 206, inertia component 208, friction coefficient component 210, interface component 212, the one or more processors 214, and memory 218 can be electrically and/or communicatively coupled to one another to perform one or more of the functions of the inertia estimator 202. In some embodiments, components 204, 206, 208, 210, and 212 can comprise software instructions stored on memory 216 and executed by processor(s) 214. The inertia estimator 202 may also interact with other hardware and/or software components not depicted in FIG. 2. For example, processor(s) 214 may interact with one or more external user interface device, such as a keyboard, a mouse, a display monitor, a touchscreen, or other such interface devices.

Interface component 212 can be configured to receive user input and to render output to the user in any suitable format (e.g., visual, audio, tactile, etc.). User input can be, for example, user-entered parameters used by the inertia estimator when executing an inertia estimation sequence (to be described in more detail below). Torque command generator 204 can be configured to output a torque control command that various continuously over time according to a defined testing sequence. Velocity monitoring component 206 can receive velocity data for the mechanical system for use in calculating the inertia and friction coefficient. In some embodiments, the velocity monitoring component 206 can measure and record the velocity of the motor over time in response to the applied torque control command generated by the torque command generator 204. Alternatively, the velocity monitoring component 206 can receive the measured velocity data from separate measuring instrumentation. Inertia component 208 and friction coefficient component 210 can be configured to calculate an inertia and a friction coefficient, respectively, based on the time-varying torque command generated by torque command generator 204 and the measured velocity curve acquired by the velocity monitoring component 206. The one or more processors 214 can perform one or more of the functions described herein with reference to the systems and/or methods disclosed. Memory 216 can be a computer-readable storage medium storing computer-executable instructions and/or information for performing the functions described herein with reference to the systems and/or methods disclosed.

Figure 3:
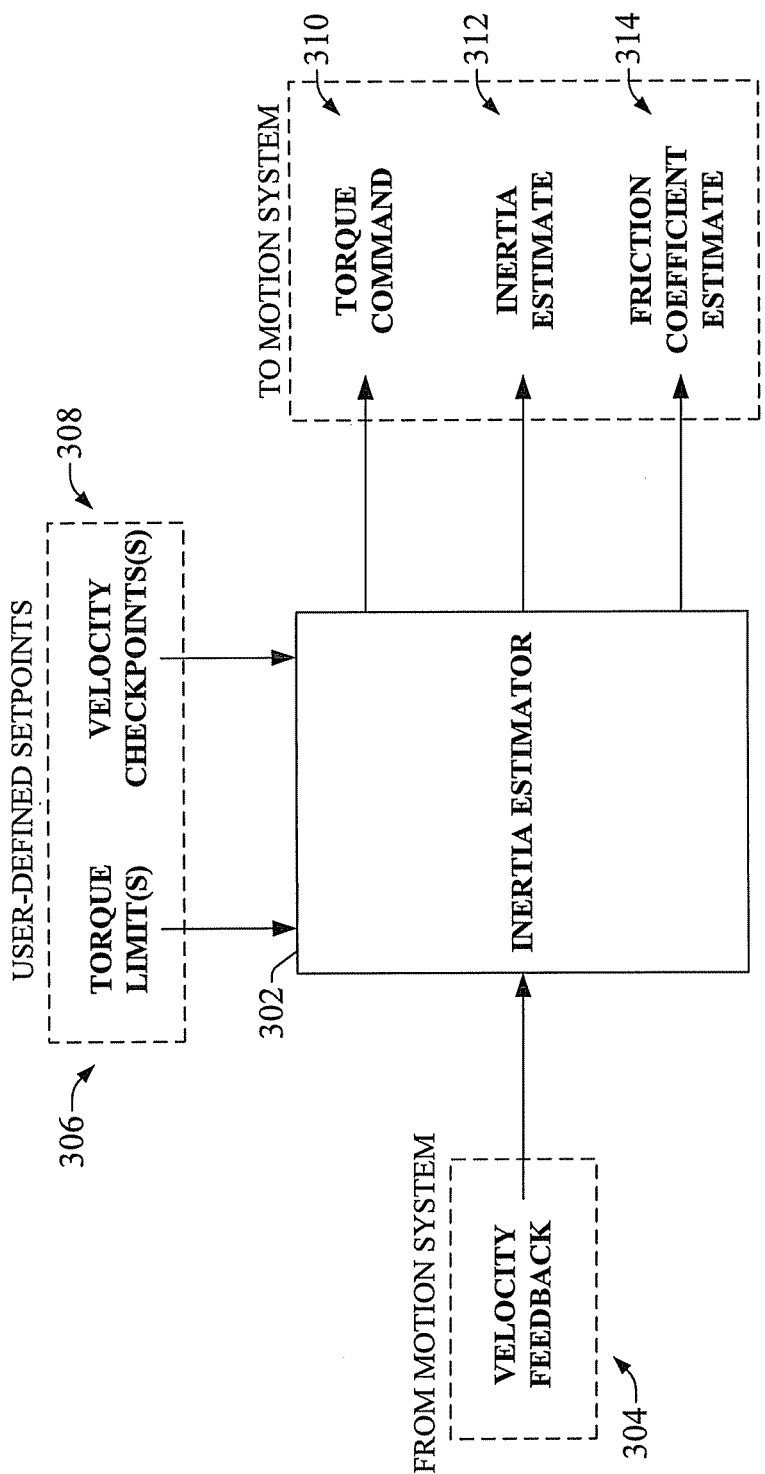
FIG. 3 is a block diagram illustrating the inputs and outputs associated with the inertia estimator.

The inertia estimator can generate estimates for a mechanical system's inertia and friction coefficient by running the system through a testing sequence and calculating the estimates based on the results. FIG. 3 is a block diagram illustrating the inputs and outputs associated with inertia estimator 302 (similar to inertia estimator 202). Inertia estimator 302 can generate a torque command 310, which instructs a motor driving the motion system to rotate in a specified direction at a given torque. Rather than issuing one or more constant torque commands that transition between constant torque values in sudden steps (resulting in a step-shaped torque output), inertia estimator 302 can control torque command 310 such that the torque value varies continuously over time between a maximum and minimum torque value. Inertia estimator 302 controls the torque value issued via torque command 310 in accordance with a testing sequence having user-defined parameters, as will be discussed in more detail below.

The motion system will accelerate or decelerate in accordance with the torque command 310 issued by inertia estimator 302, and velocity feedback 304 from the motion control system is provided to inertia estimator 302. Velocity feedback 304 represents the velocity of the motion system over time in response to application of torque command 310. In an exemplary testing sequence, inertia estimator 302 can control torque command 310 as a function of the velocity feedback 304 and one or more user-defined setpoints. The user-defined setpoints can include one or more torque limits 306 defining the upper and lower bounds of the torque command signal, and/or one or more velocity checkpoints 308 defining trigger velocity valves used to control the torque command 310 and generate the estimates.

Upon completion of the testing sequence, inertia estimator 302 generates an estimate of the motion system's inertia 312 and/or an estimate of the motion system's friction coefficient 314. Inertia estimator 302 determines these estimates based on the torque command 310 that was issued to the motion system and the corresponding velocity feedback 304. In one or more embodiments, inertia estimator 302 can integrate selected portions of the torque curve (corresponding to torque command 310) and the velocity curve (corresponding to velocity feedback 304) over time, and calculate the inertia estimate 312 and the friction coefficient estimate 314 as functions of these integrals.

Figure 4:
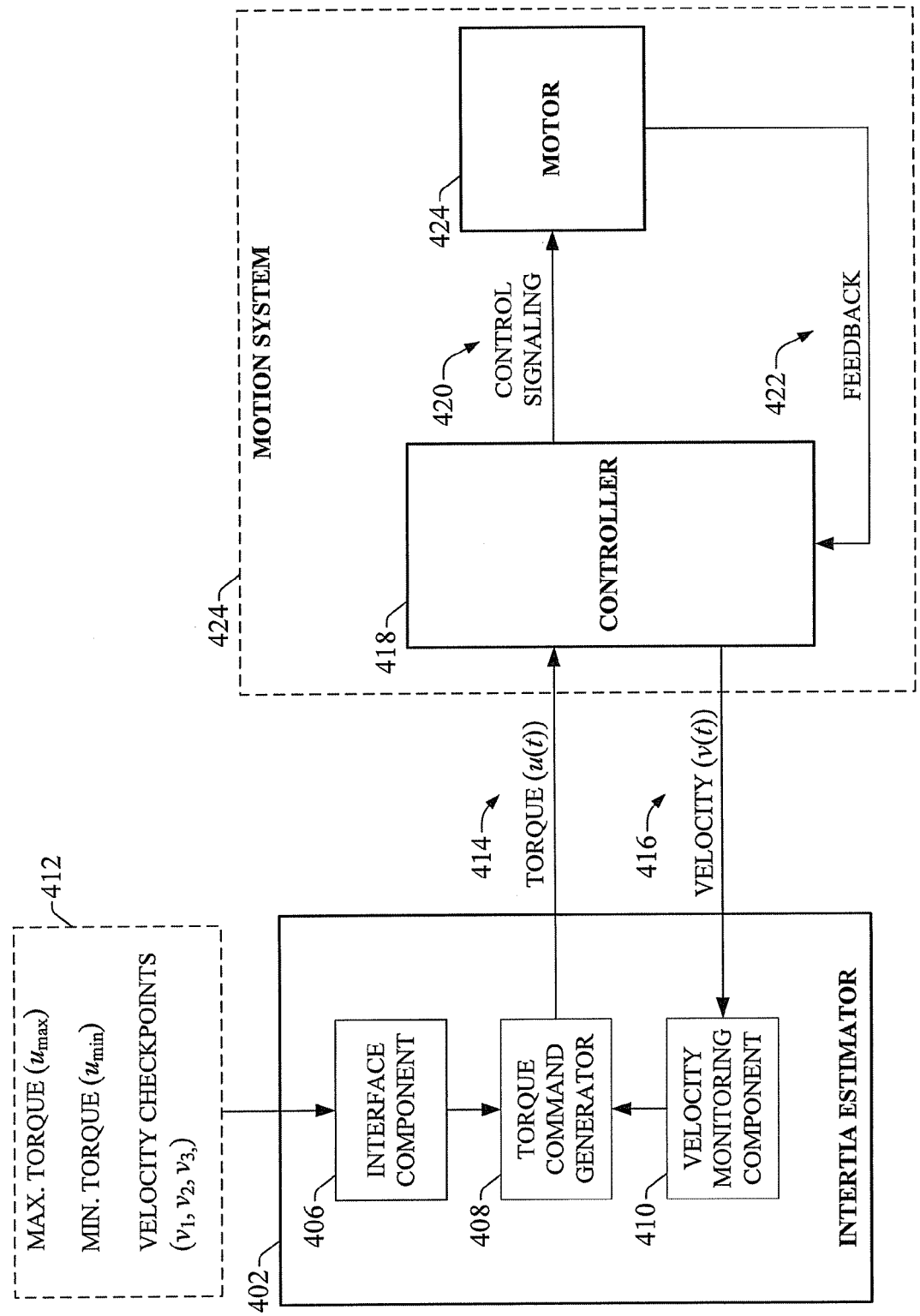
FIG. 4 is a block diagram depicting the interactions between the inertia estimator and a motion control system during an exemplary test sequence.

FIG. 4 illustrates the interactions between inertia estimator and a motion control system during an exemplary testing sequence. In this example, motion system 424 comprises a motor 424, which responds to control signaling 420 provided by controller 418. Motor 424 is used to drive a load (not shown), such as a positioning axis, a rotational component of a machine, or other motor-driven load. Controller 418 also monitors feedback 422, which provides substantially real-time state data for the motor 424 (e.g., position, speed, etc.).

In the illustrated example, inertia estimator 402 is depicted as a separate element from controller 418 for clarity. For such configurations, inertia estimator 402 can exchange data with controller 418 or other elements of the motion system 424 via any suitable communications means, including but not limited to wired or wireless networking, hardwired data links, or other such communication means. In other embodiments, inertia estimator 402 can be an integrated component of controller 418. For example, inertia estimator 402 can be a functional component of the controller's operating system and/or control software executed by one or more processors residing on the controller 418. Inertia estimator 402 can also be a hardware component residing within controller 418, such as a circuit board or integrated circuit, that exchanges data with other functional elements of the controller 418. Other suitable implementations of inertia estimator 402 are within the scope of certain embodiments of the present disclosure.

Prior to testing, one or more user-defined parameters 412 are provided to inertia estimator 402 via interface component 406 (similar to interface component 212 described in connection with FIG. 2). These parameters can include a maximum torque $u_{max}$ and a minimum torque $u_{min}$ defining upper and lower limits on the torque command to be generated by torque command generator 408 (similar to torque command generator 204 of FIG. 2). In some embodiments, the inertia estimator 402 may only require the maximum torque $u_{max}$ to be defined by the user, and can use the magnitude of the defined maximum torque as a limiting value for both the forward and reverse directions. In other embodiments, inertia estimator 402 may accept values for both $u_{max}$ and $u_{min}$, allowing for different torque setpoints for the forward and reverse directions, respectively. The values selected for $u_{max}$ and $u_{min}$ can correspond to the expected operational limits of the motion system 424, thereby allowing the inertia and friction coefficient to be determined based on characteristics of the motion system 424 over the system's entire torque profile. User-defined parameters 412 can also include one or more velocity checkpoints (v1, v2, v3 . . . ) defining critical velocities used to define stages of the test sequence, as will be described in more detail below.

Interface component provides torque command generator 408 with the user-defined parameters 412. When testing is initiated, torque command generator 408 outputs a torque command 414 to the motion system 424. Torque command 414 is represented as u(t), since the torque command generator 408 will vary the torque command continuously over time. In the configuration depicted in FIG. 4, inertia estimator 402 sends torque command 414 to controller 418, which in turn instructs the motor 424 (via control signaling 420) to rotate in the indicated direction at the indicated torque. As the motor is rotating, velocity monitoring component 410 reads velocity data 416 from controller 418 (which itself measures the velocity of the motor 424 via feedback 422). The measured velocity 416 over time is represented as v(t).

Figure 5:
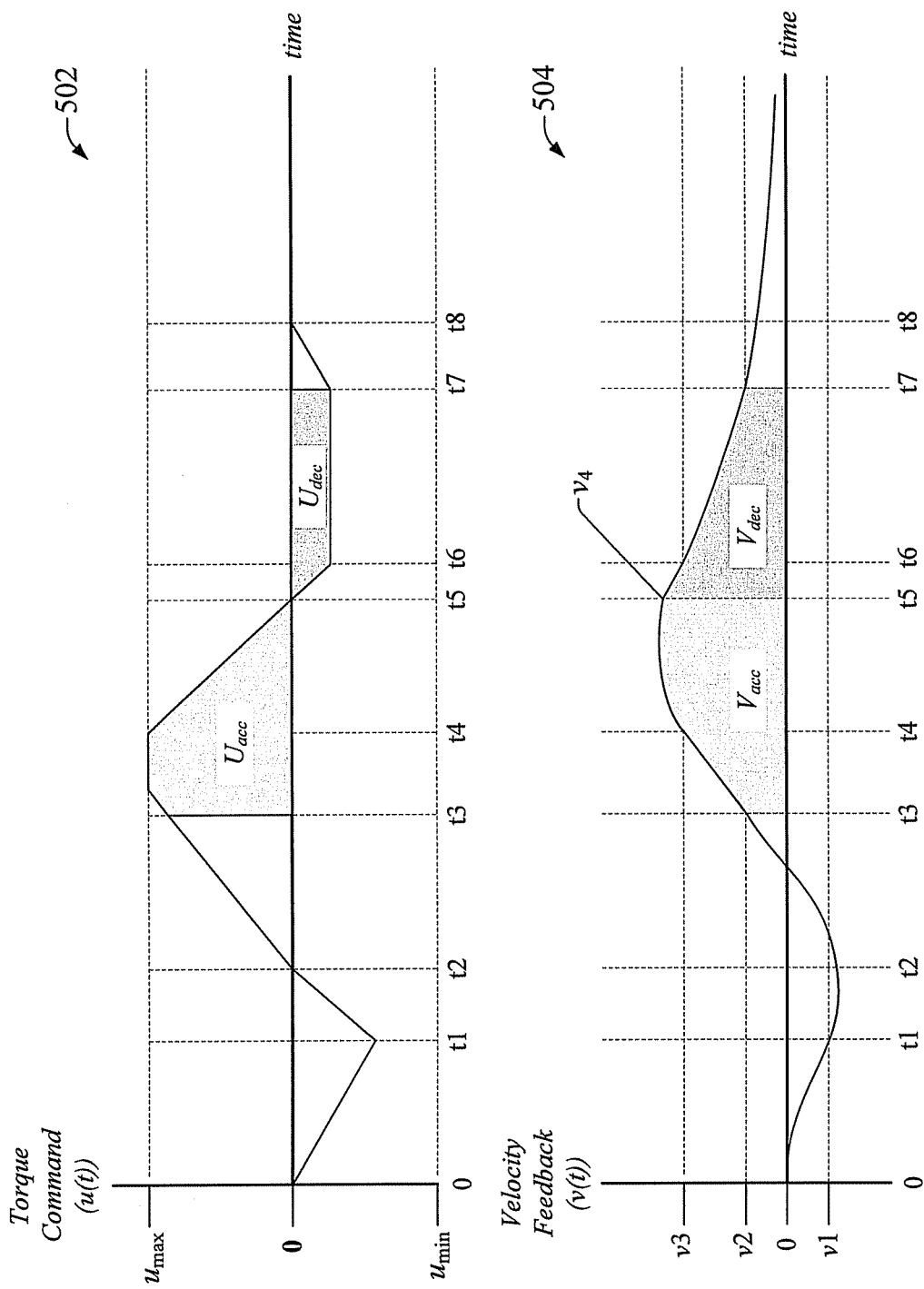
FIG. 5 illustrates an exemplary torque command u(t) and corresponding velocity feedback v(t) graphed over time.

As testing proceeds, torque command generator 408 can vary the torque command 414 in accordance with a pre-defined testing sequence, wherein phases of the testing sequence are triggered by the velocity feedback 416 relative to the user-define parameters 412. An exemplary testing sequence is now explained with reference to FIG. 5, which illustrates an exemplary torque command u(t) and corresponding velocity feedback v(t) graphed over time. As shown on torque graph 502, the torque command signal u(t) is bounded by $u_{max}$ and $u_{min}$. Velocity checkpoints v1, v2, and v3, shown on velocity graph 504, will determine phase transitions of the testing sequence. The values of $u_{max}$, $u_{min}$, v1, v2, and v3 can be defined by the user prior to testing (e.g., as user-defined parameters 412 of FIG. 4).

When testing begins at time t=0, the applied torque signal u(t) and the motor velocity v(t) are both zero. Initially, torque command generator sends a negative torque signal to the motion system, causing the motion system to accelerate in the negative direction. For the first phase of this exemplary test, the torque command generator gradually decreases the torque command u(t) until the velocity of the motor v(t) reaches v1 or until the torque command u(t) reaches $u_{min}$. In the present example, the motor velocity v(t) reaches v1 at time t=t1, triggering the second phase of the test. As shown on graph 502, the torque command u(t) is decreased continuously at a substantially constant rate between time t=0 and t=t1. In one or more embodiments, the rate at which torque command is decreased or increased (that is, the slope of u(t)) can be configured as a user-defined parameter of the inertia estimator 402 (e.g., via interface component 406).

For the second phase of the test (starting at time t=t1), the torque command generator gradually increases the torque command u(t) until either the motor velocity v(t) reaches velocity checkpoint v3 or the torque command u(t) reaches the torque setpoint $u_{max}$. In the present example, the torque command u(t) reaches the upper limit $u_{max}$ before the motor velocity v(t) reaches velocity checkpoint v3. Since the motor is still accelerating at this time, the torque command generator maintains the torque command signal at $u_{max}$ until the velocity v(t) reaches v3. As illustrated on velocity graph 504, the motor velocity reaches v3 at time t=t4. If the velocity v(t) does not reach velocity checkpoint v3 within a defined timeout period after torque command signal has reached $u_{max}$ (e.g., if velocity checkpoint v3 was inadvertently set higher than the physical velocity limit of the motion system), the inertia estimator can initiate a suitable timeout handling routine. This timeout handling routine can comprise, for example, aborting the testing sequence and displaying an error message via interface component 406.

As the motion system is accelerating toward v3 during this phase, the velocity passes through velocity checkpoint v2, which denotes the acceleration phase of the testing sequence. Velocity checkpoint v2 is set to be greater than zero and less than v3, and is used to delineate the beginning of the acceleration phase of the testing sequence and the end of the deceleration phase, as will be discussed in more detail below.

Upon determining that the motor velocity has reached v3, the torque command generator begins the third phase of the test at time t=t4 by gradually decreasing the torque command u(t). As the torque command u(t) is decreased, the motor will continue to accelerate for a brief time until the value of the torque command u(t) becomes less than the friction force of the motion system, at which time the motor will begin to decelerate. Since the motor was still accelerating when the velocity reached v3 at time t=t3, the velocity will continue past v3 for some time after the torque command begins decreasing. In accordance with the testing sequence definition, the torque command generator continues to decrease u(t) until the motor velocity v(t) returns to velocity checkpoint v3 (at time t=t6), and thereafter holds u(t) constant until the motor velocity v(t) returns to velocity checkpoint v2 (at time t=t7). At this point, the inertia estimator has the data it requires to calculate estimates for the inertia and friction coefficient for the mechanical system. The torque command generator therefore brings the torque command signal u(t) back to zero (at t=t8), allowing the motion system to coast to a resting state, as illustrated on graph 504 by the tapering end of the v(t) curve.

The testing sequence described above in connection with FIG. 5 is only intended to represent an exemplary, non-limiting testing sequence. It is to be understood that any suitable testing sequence that continuously varies the torque command u(t) over time and measures a corresponding velocity profile v(t) for the motion system is within the scope of certain embodiments of this disclosure. For example, although the foregoing example describes the torque command u(t) as changing direction in response to the velocity v(t) reaching the respective velocity checkpoints, some test sequences may include phases in which the torque command u(t) only changes its rate of increase or decrease when the velocity checkpoint is reached, without altering the direction of the torque command (e.g., an increasing torque command may continue to increase in response to v(t) reaching a phase checkpoint, but at a slower rate).

As the foregoing testing sequence is performed, the inertia estimator 402 records both the torque command signal generated by torque command generator 408 and the corresponding motor velocity read by the velocity monitoring component 410. These torque and velocity curves characterize the motion system 424 such that accurate estimates of the inertia and friction coefficient can be calculated based on the curves. In one or more embodiments, inertia estimator calculates these estimates based on integrals of and. The following illustrates an exemplary, non-limiting technique for leveraging integrals of and to derive estimates for the inertia and friction coefficient for a motion system.

A motion system can be described by the differential equation:

$$J\dot{v}(t) = -Bv(t) + u(t) \quad (1)$$

where J is the inertia, B is the friction coefficient, is the torque command signal, and is the corresponding velocity of the motion system in response to the torque signal (e.g., and described above in connection with FIGS. 4 and 5).

Integrating both sides of equation (1) for respective acceleration and deceleration stages yields:

$$J\Delta v_{acc}(t) = -B\int v_{acc}(t) + \int u_{acc}(t) \quad (2)$$

$$J\Delta v_{dec}(t) = -B\int v_{dec}(t) + \int u_{dec}(t) \quad (3)$$

where and are portions of and, respectively, corresponding to the acceleration phase of the testing sequence, and are portions of and, respectively, corresponding to the deceleration phase.

Equations (2) and (3) can be solved to yield estimates of the inertia J and friction coefficient B:

$$J = \frac{\int u_{dec}(t) \int v_{acc}(t) - \int u_{acc}(t) \int v_{dec}(t)}{\Delta v_{dec}(t) \int v_{acc}(t) - \Delta v_{acc}(t) \int v_{dec}(t)} \quad (4)$$

$$B = \frac{\Delta v_{dec}(t) \int u_{acc}(t) - \Delta v_{acc} \int u_{dec}(t)}{\Delta v_{dec}(t) \int v_{acc}(t) - \Delta v_{acc}(t) \int v_{dec}(t)} \quad (5)$$

For the exemplary torque and velocity curves depicted in FIG. 4, the acceleration phase is taken to be the period starting when velocity v(t) reaches velocity checkpoint v2 for the first time (at time t=t3) and ending when torque signal u(t) crosses zero (at time t=t5). The velocity of the motion system at the end of this acceleration phase is recorded as v4 (as indicated on graph 504). The deceleration phase is taken to be the period starting when torque signal u(t) crosses zero (at time t=t5) and ending when velocity v(t) returns to v2 (at time t=t7). The inertia estimator 402 can be configured to recognize these acceleration and deceleration phase delineations in order to derive the estimated inertia and friction coefficient based on equations (4) and (5) above. It is to be appreciated that other criteria for delineating the acceleration and deceleration phases are also within the scope at certain embodiments of this disclosure.

Given these acceleration and deceleration phase definitions, the integrals of $U_{acc}(t)$ and $U_{dec}(t)$ are represented by the shaded regions of graph 502 labeled $U_{acc}$ and $U_{dec}$, respectively, and the integrals of $v_{acc}(t)$ and $v_{dec}(t)$ are represented as the shaded regions of graph 504 labeled $V_{acc}$ and $V_{dec}$, respectively. Accordingly, $U_{acc}$, $U_{dec}$, $V_{acc}$, and $V_{dec}$ are defined as follows:

$$U_{acc} = \int u_{acc}(t) \quad (6)$$

$$U_{dec} = \int u_{dec}(t) \quad (7)$$

$$V_{acc} = \int v_{acc}(t) \quad (8)$$

$$V_{dec} = \int v_{dec}(t) \quad (9)$$

Substituting equations (6)-(9) into equations (4) and (5), the inertia J and friction coefficient B can be represented as:

$$J = \frac{U_{dec}V_{acc} - U_{acc}V_{dec}}{\Delta v_{dec}(t)V_{acc} - \Delta v_{acc}(t)V_{dec}} \quad (12)$$

$$B = \frac{\Delta v_{dec}(t)U_{acc} - \Delta v_{acc}U_{dec}}{\Delta v_{dec}(t)V_{acc} - \Delta v_{acc}(t)V_{dec}} \quad (13)$$

where the velocity deltas $\Delta v_{acc}(t)$ and $\Delta v_{dec}(t)$ are defined as:

$$\Delta v_{acc}(t) = v4 - v2 \quad (10)$$

$$\Delta v_{dec}(t) = v2 - v4 \quad (11)$$

Equations (12) and (13) are exemplary, non-limiting formulas for calculating an estimated inertia and friction coefficient for a motion system based on continuous torque and velocity data. It is to be appreciated that any suitable formula for calculating these parameters through integration of a continuous torque signal and a corresponding velocity curve are within the scope of certain embodiments of this disclosure.

Figure 6:
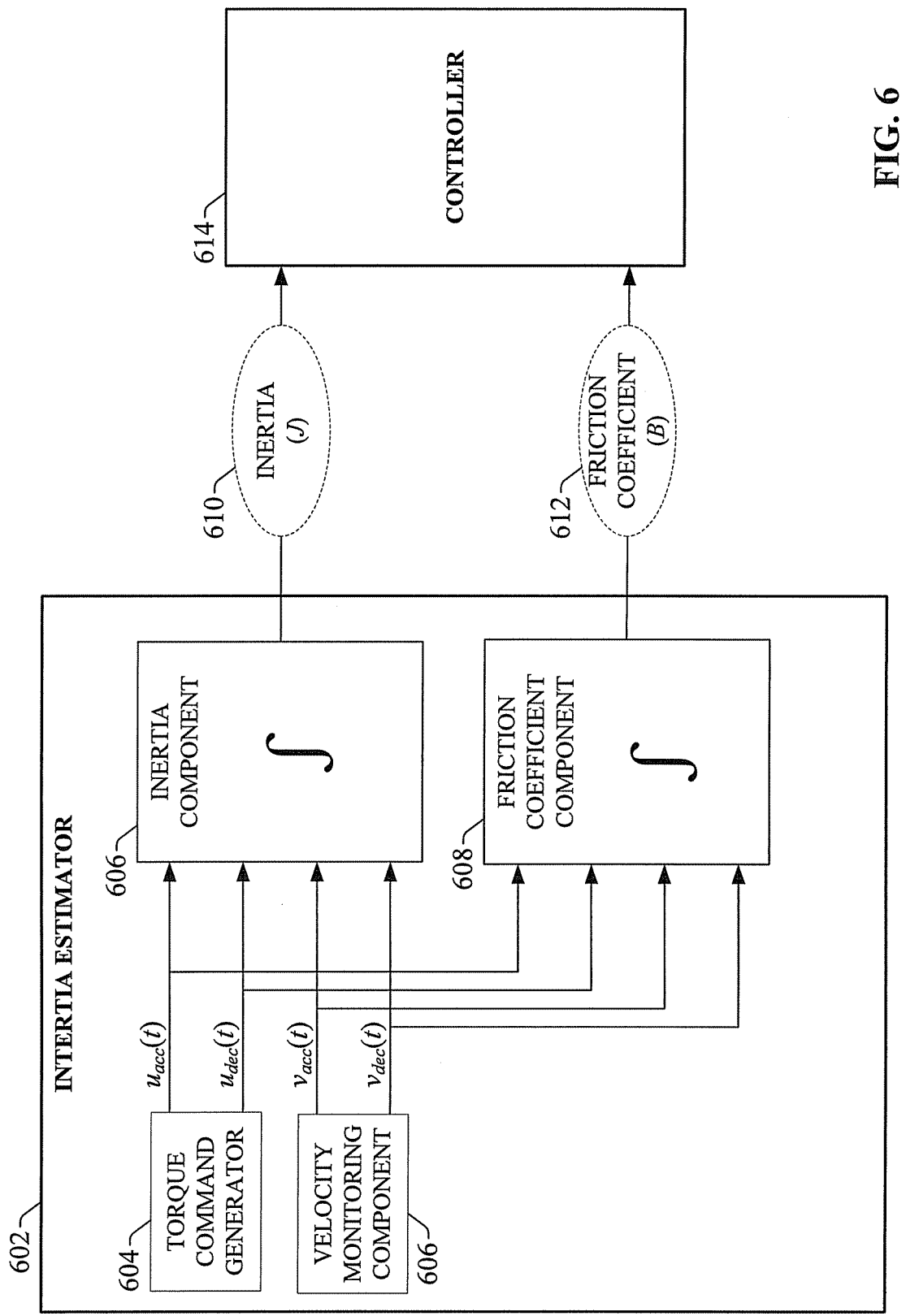
FIG. 6 is a block diagram depicting an inertia estimator having an inertia component and friction coefficient component.

Upon completion of the testing sequence described above in connection with FIGS. 4 and 5, the inertia estimator can apply equations (12) and (13) (or other suitable formulas) to the continuous torque data u(t) and motor velocity data v(t) acquired by the test to derive estimates for the inertia and friction coefficient. FIG. 6 is a block diagram depicting an inertia estimator 602 having an inertia component 606 and friction coefficient component 608 according to one or more embodiments of the present disclosure. Although inertia estimator 602 is depicted as including both an inertia component 606 and a friction coefficient component 608, it is to be appreciated that some embodiments of the inertia estimator 602 may include only one of these components without deviating from the scope of the present disclosure. That is, the inertia estimator 602 may be configured to calculate one or both of the inertia or the friction coefficient.

After the torque data u(t) and velocity data v(t) have been obtained, the torque command generator 604 (similar to torque command generator 408 and 204) provides the torque data to inertia component 606 and friction coefficient component 608 (similar to inertia component 208 and friction coefficient component 210, respectively, of FIG. 2). Similarly, the velocity monitoring component 606 can provide the acquired velocity data v(t) to inertia component 606 and friction coefficient component 608. According to one or more embodiments, inertia estimator 602 can segregate the torque and velocity data into acceleration phase data ($U_{acc}(t)$ and $v_{acc}(t)$) and deceleration phase data ($u_{dec}(t)$ and $V_{dec}(t)$) so that values can be derived for $U_{acc}$, $U_{dec}$, $V_{acc}$, and $V_{dec}$ according to equations (6)-(9) above.

Inertia component 606 can integrate $u_{acc}(t)$, $u_{dec}(t)$, $v_{acc}(t)$, and $v_{dec}(t)$ and calculate the estimated inertia J 610 as a function of the integrals (e.g., based on equation (12) or variation thereof). Similarly, friction coefficient component 608 can calculate the estimated friction coefficient B 616 as a function of the integrals (e.g., based on equation (13)). Inertia estimator 602 can then output the estimated inertia J 610 and friction coefficient B 612 according to the requirements of a particular application in which the inertia estimator operates. For example, inertia estimator 602 may provide inertia J 610 and friction coefficient B 612 to a motion controller 614, which can use the values of J and B to facilitate tuning one or more gain coefficients. Inertia estimator 602 may also output the estimated values for J and B to a display (e.g., via interface component 212) so that the values can be viewed and entered manually into a separate motion control or tuning application. Accurate estimates of the motion system's inertia J 610 and friction coefficient B 612 can simplify the tuning process and facilitate accurate parameter tuning, resulting in precise and energy-efficient machine motion. Moreover, since the inertia estimator calculates values for J and B based on data collected over the motion system's entire torque profile (rather than extrapolating based on the system's response to one or more constant torque commands), the inertia and friction coefficient estimates derived by the inertia estimator are more likely to be accurate over the full operational range of the motion system.

Figure 7:
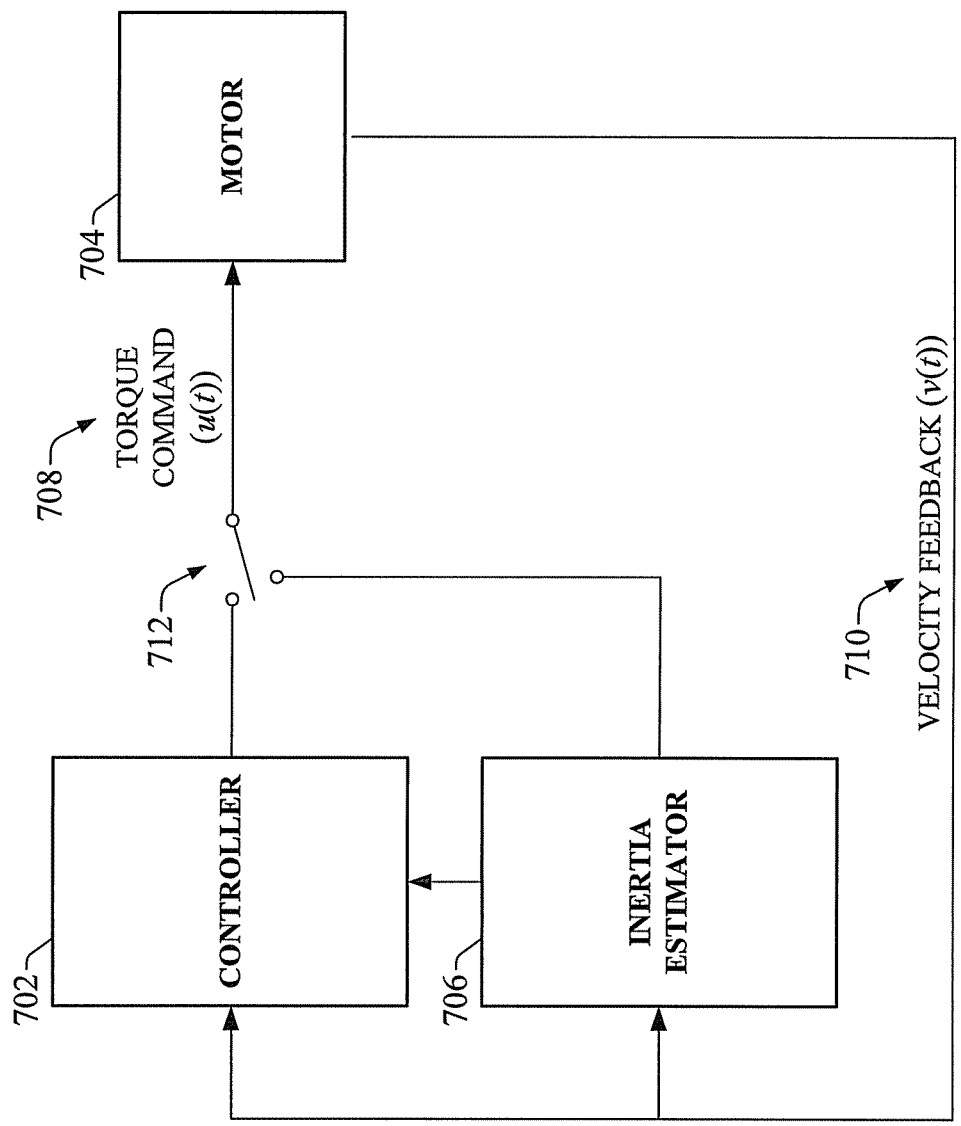
FIG. 7 is a block diagram of an exemplary configuration in which an inertia estimator operates as an independent component relative to a motion controller.

While the preceding examples have described the inertia estimator as sending the torque command u(t) and receiving velocity feedback v(t) via the motion controller (e.g., controller 418 of FIG. 4), either as a separate component operating through the controller or as an integrated component of the controller, other configurations are within the scope of certain embodiments of this disclosure. For example, FIG. 7 illustrates an architecture in which inertia estimator 706 operates as an independent separate component from controller 702. In this exemplary architecture, inertia estimator 706 is capable of generating its own torque command signal independently of controller 702. The motor 704 being tested and controlled can receive its torque command signal 708 from either controller 702 or inertia estimator 706 depending on the state of switch 712. The velocity feedback 710 from the motor 704 can be provided to both the controller 702 and inertia estimator 706. During the testing sequence, switch 712 can be set to convey the torque command u(t) from inertia estimator 706. Testing can proceed as described in previous examples, such that inertia estimator 706 generates estimated values for the inertia J and friction coefficient B for the motion system. Inertia estimator 706 can then provide the estimated values for J and B to the controller 702, which can use these values to determine suitable controller gain coefficients or other control parameters. Once the controller parameters have been set, switch 712 can be positioned to provide torque command 708 from controller 702 to the motor 704, and normal operation of the motion system can be carried out using the controller gain coefficients derived based on J and B.

Figure 8:
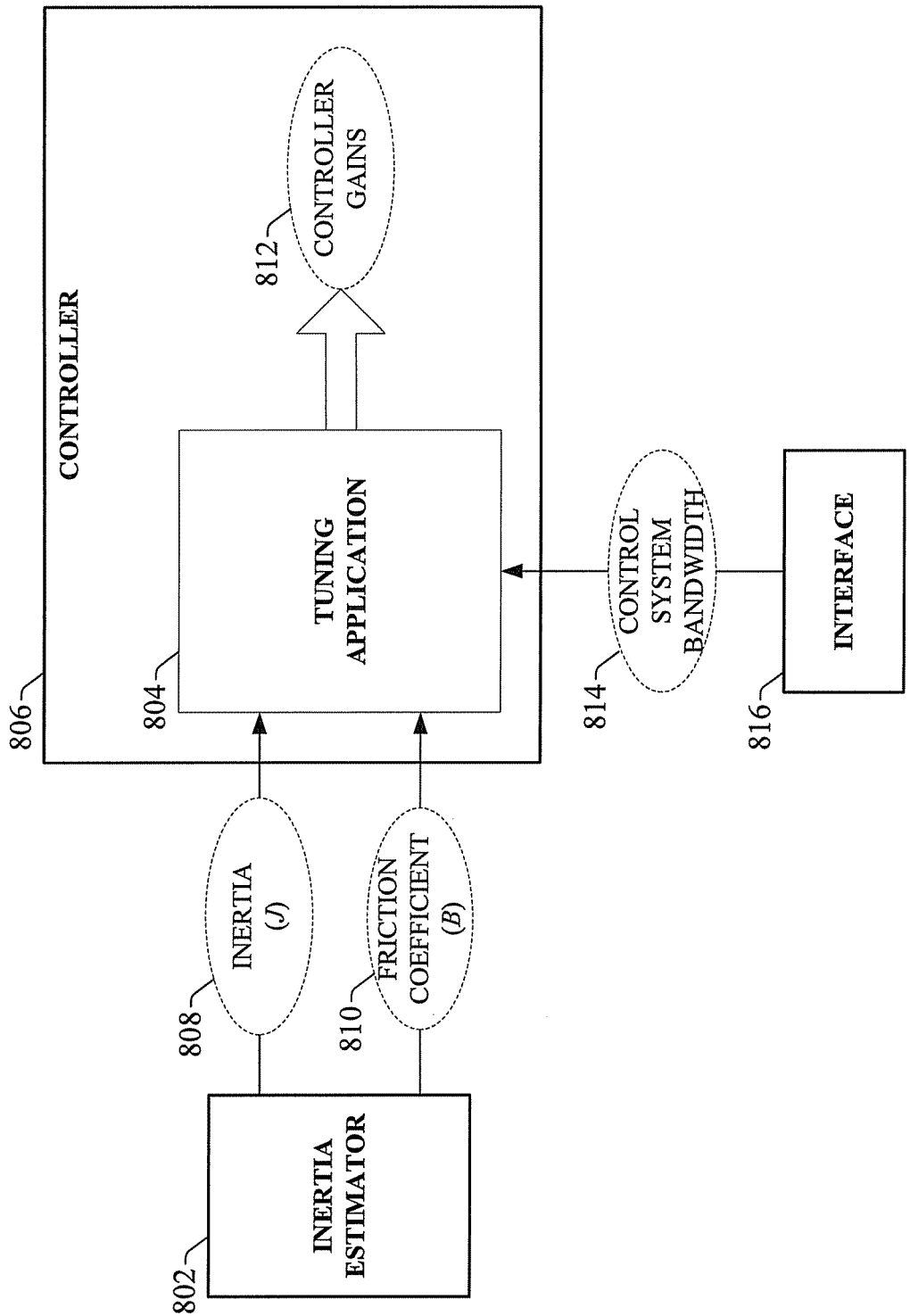
FIG. 8 illustrates an exemplary motion control tuning application that utilizes the estimated inertia and friction coefficient generated by the inertia estimator.

FIG. 8 illustrates an exemplary motion control tuning application that utilizes the estimated inertia and friction coefficient generated by the inertia estimator. In this example, a tuning application 804 is used to tune the controller gains for controller 806, where the controller 806 controls operation of a motor-driven motion system (not shown). Inertia estimator 802 can generate estimates of the motion system's inertia J 808 and friction coefficient B 810 according to the techniques described above. Specifically, inertia estimator 802 instructs controller 806 to send a continuous torque command to the motions system's motor, where the torque command varies continuously over time according to a predefined testing sequence. Alternatively, for embodiments in which inertia estimator 802 operates independently of controller 806 (as in the exemplary configuration depicted in FIG. 7), the inertia estimator 802 can generate and send its own continuous torque command to the motion system. The testing sequence can include acceleration and deceleration phases, during which the inertia estimator 802 monitors and records the velocity of the motion system in response to the applied torque command. At the conclusion of the testing sequence, inertia estimator 802 can calculate estimates of inertia J 808 and friction coefficient B 810 based on integrals of the time-varying torque command signal and the corresponding time-varying motion system velocity (e.g., based on equations (12) and (13)).

Inertia estimator 802 can then provide inertia J 808 and friction coefficient B 810 to the tuning application 804. Alternatively, inertia estimator 802 can render the values of J and B on a user interface, allowing a user to manually enter the estimated inertia and friction coefficients into the tuning application 804. Knowledge of J and/or B can allow the tuning application 804 to generate suitable estimates for one or more controller gains 812 based on the mechanical properties of the motion system. Tuning application 804 can generate suitable values for controller gains 812 as a function of the inertia J and/or friction coefficient B 810, as well as control system bandwidth (e.g., crossover frequency) 814, which can be manually adjusted by the user via interface 816 to achieve desired motion characteristics.

In typical applications, the inertia estimator described herein can be used to generate reliable estimates of a motion system's inertia J and friction coefficient B during initial deployment of the motion control system, prior to normal operation. Specifically, the inertia estimator can be used in connection with configuring and tuning the controller parameters (e.g., controller gain coefficients) prior to runtime. Once set, these parameters typically remain fixed after system startup, unless it is decided to re-tune the system at a later time. However, in some embodiments, the inertia estimator can be configured to automatically recalculate values for J and B periodically or continuously during runtime. Using such configurations, controller parameters that are based on estimates of J and B can be dynamically adjusted during normal operation, substantially in real-time, to compensate for gradual changes to the motion system's mechanical properties (e.g., as a result of mechanical wear and tear, changes to the load seen by a motor, etc.).

Figure 9:
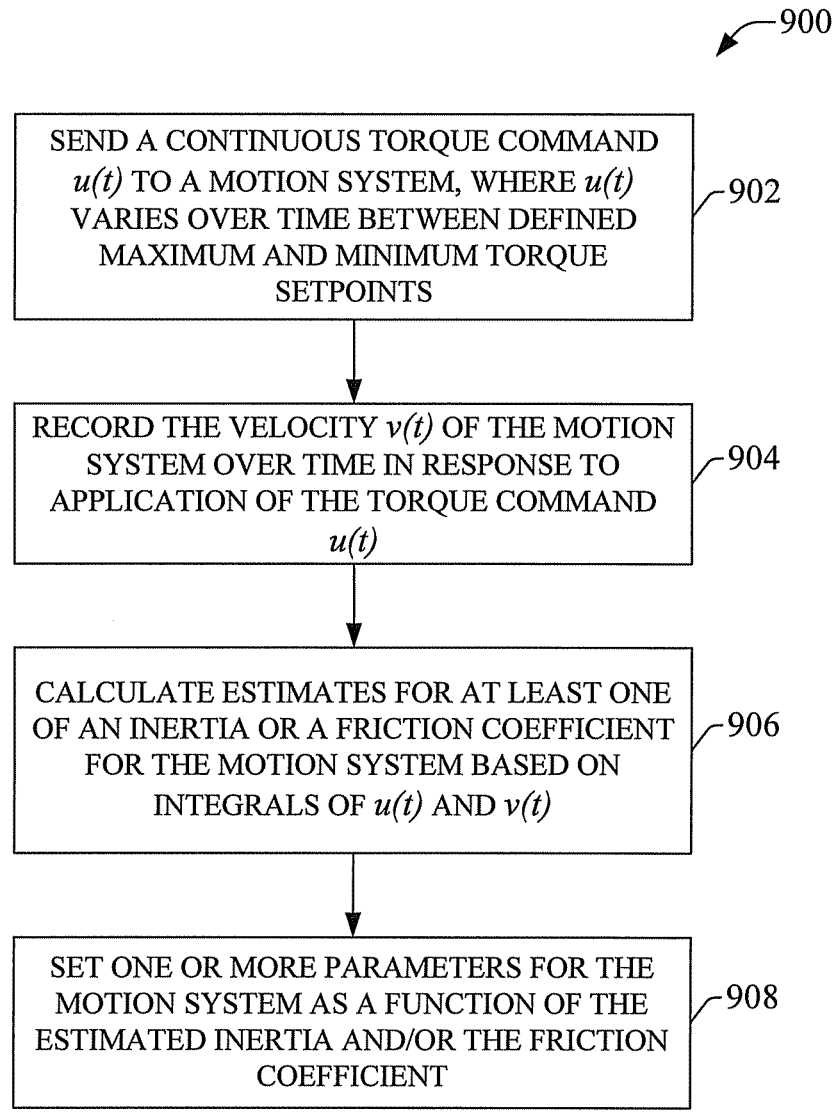
FIG. 9 is a flowchart of an example methodology for estimating an inertia and a friction coefficient for a controlled mechanical system.
Figure 10:
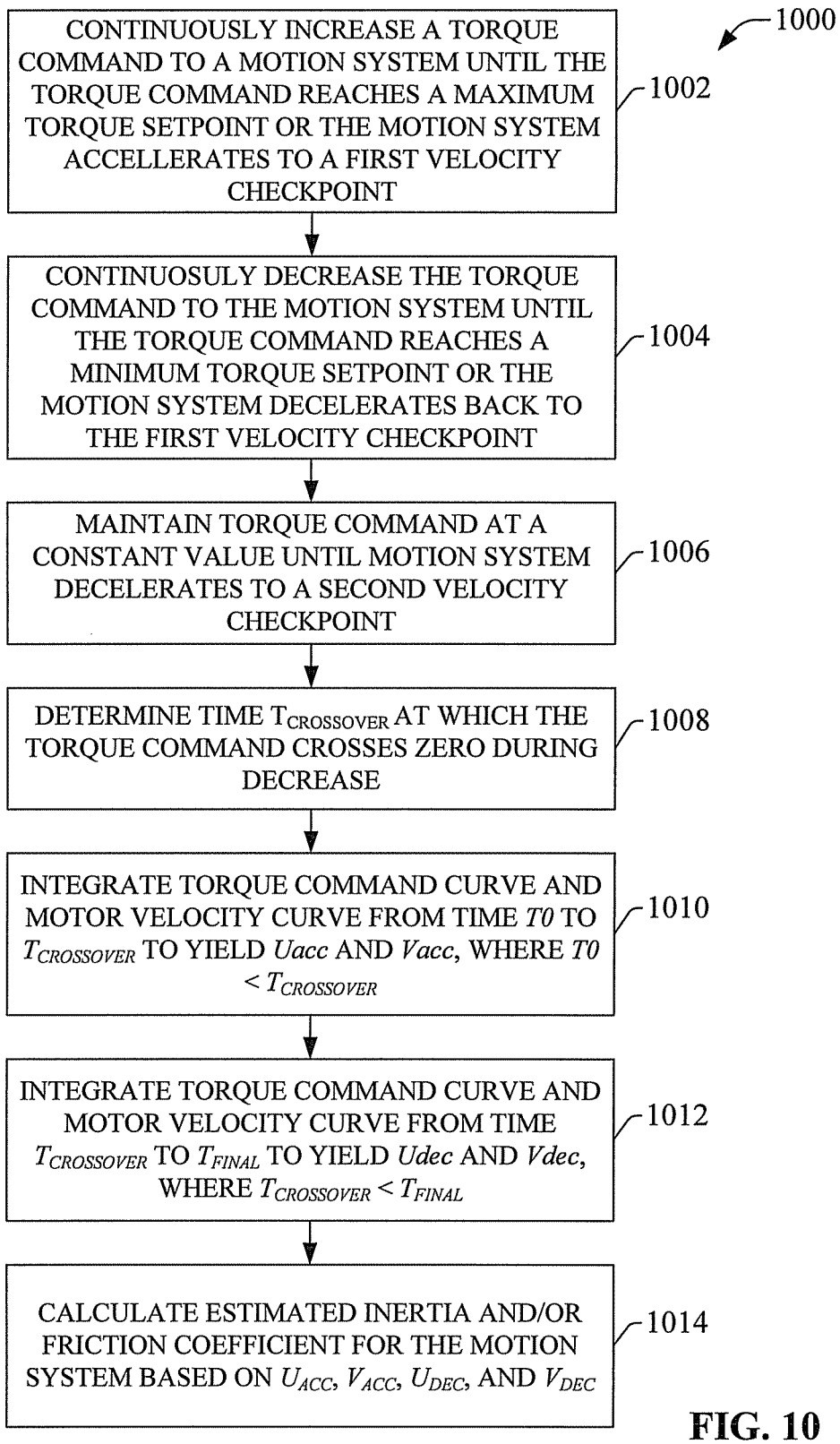
FIG. 10 is a flowchart of an example methodology for executing a testing sequence on a motion control system in order to estimate the inertia and friction coefficient.

FIGS. 9-10 illustrate various methodologies in accordance with certain disclosed aspects. While, for purposes of simplicity of explanation, the methodologies are shown and described as a series of acts, it is to be understood and appreciated that the disclosed aspects are not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with certain disclosed aspects. Additionally, it is to be further appreciated that the methodologies disclosed hereinafter and throughout this disclosure are capable of being stored on an article of manufacture to facilitate transporting and transferring such methodologies to computers.

FIG. 9 illustrates an example methodology 900 for estimating an inertia and a friction coefficient for a controlled mechanical system. At 902, a continuous torque command u(t) is sent to a controller of a motion system, where torque command u(t) varies over time between defined maximum and minimum torque setpoints. In one or more embodiments, the torque command u(t) can accord to a predefined testing sequence, such that the output of u(t) depends on the phase of the testing sequence and the response of the mechanical system relative to one or more user-defined setpoints. The test sequence can comprise both acceleration and deceleration phases, corresponding to increasing and decreasing motor speeds, respectively. For two-directional testing, the torque commend u(t) can vary between positive and negative torque values during the testing sequence, causing the motion system to accelerate in both directions during the test.

At 904, the velocity v(t) of the motion system in response to the torque command u(t) is recorded. Thus, upon completion of the testing sequence, data curves for both the applied torque command u(t) and the resultant motion system velocity v(t) are obtained for $t=0-t_{end}$, where $t_{end}$ is the duration of the test sequence.

At 906, estimates for at least one of the inertia or the friction coefficient of the motion system are calculated based on integrals of the torque curve u(t) and the velocity curve v(t). In one or more embodiments, the curves for u(t) and v(t) can be divided into an acceleration phase and a deceleration phase, and the inertia and the friction coefficient can be calculated based on respective integrals of the acceleration and deceleration phases (e.g., using equations (12) and (13) above, or other suitable equation). At 908, one or more parameters for the motion system are set as a function of the estimated inertia and/or friction coefficient calculated at step 906. In a non-limiting example, one or more controller gain coefficients can be set based on the estimated inertia and/or friction coefficient calculated according to steps 902-906.

FIG. 10 illustrates an example methodology 1000 for executing a testing sequence on a motion control system in order to estimate the inertia and friction coefficient. At 1002, a torque command to the motion system is continuously increased until the torque command reaches a maximum torque setpoint or until the motion system accelerates to a first velocity checkpoint (e.g., velocity checkpoint v3 of FIG. 5) in response to the applied torque command. The maximum torque setpoint and first velocity checkpoint can correspond to upper operational bounds for the motion system, and can be set prior to testing (e.g., a maximum torque and velocity expected during normal operation of the motion system). The rate at which the torque command is increased can also be defined by the user. In one or more embodiments, if the torque setpoint reaches the maximum torque setpoint before the velocity of the motion system reaches the first velocity checkpoint, the torque command can be held at the maximum torque value until the motion system accelerates to the first velocity checkpoint. If the velocity of the motion system does not reach the first velocity checkpoint within a defined timeout period, an appropriate timeout handling sequence can be initiated.

As the motion system accelerates from rest toward the first velocity checkpoint, the velocity will pass through a second velocity checkpoint (e.g., velocity checkpoint v2 of FIG. 5), where the second velocity checkpoint is greater than zero and less than the first velocity checkpoint. The acceleration phase of the test is initiated when the velocity initially reaches this second velocity checkpoint.

Upon determining that the motion system has accelerated to the first velocity checkpoint, the torque command can be continuously decreased at 904, until the torque command reaches a minimum torque setpoint or until the motion system decelerates back to the first velocity checkpoint. In this regard, since the motion system was accelerating at the time the first velocity checkpoint was reached at step 1002, the velocity will continue to increase beyond the first velocity checkpoint for some time after the torque signal begins decreasing in step 1004. The decreasing torque command signal will subsequently cause the motion system to decelerate back to the first velocity checkpoint. As in step 1002, the rate at which the torque command is decreased can be configured as a user-defined parameter. In the present example, the torque command decreases to zero prior to the motion system returns to the first velocity checkpoint, and continues to decrease in the negative direction until the minimum torque setpoint is reached or until the motion system decelerates to the first velocity checkpoint. That is, the torque command crosses zero during this phase of the testing sequence. This signals the end of the acceleration phase and the beginning of the deceleration phase of the test. Similar to step 1002, if the torque command decreases to the minimum torque setpoint before the motion system reaches the first velocity checkpoint, the torque command will be held at the minimum torque value until the first velocity checkpoint is reached.

When the motion system velocity has returned to the first velocity checkpoint, the torque command value at the time the first velocity checkpoint was reached is maintained as a constant value at 1006 until the motion system decelerates back to the second velocity checkpoint. This triggers the end of the deceleration phase of the test.

At 1008, the time at which the torque command crossed zero during step 1004 is determined. This time, designated $T_{CROSSOVER}$, can be used to demarcate the acceleration phase and deceleration phase of the test sequence (in the example described above in connection with FIG. 4, $T_{CROSSOVER}$=t5). At 1010, integrations are performed on the acceleration phase portions of the torque command curve and corresponding velocity curve of the motion system. That is, the torque command data is integrated from time T0 to $T_{CROSSOVER}$, where T0 represents the start time for the acceleration phase (the time at which the velocity initially crossed the second velocity checkpoint; e.g., time t3 of FIG. 4). The result of this acceleration phase integration of the torque command is designated as $U_{acc}$. Likewise, the continuous velocity data measured from the motion control system in response to the applied torque command is integrated from time T0 to $T_{CROSSOVER}$ to yield an integrated velocity result $V_{acc}$ for the acceleration phase.

At 1012, similar integrations are performed for the deceleration portions of the torque and velocity data. That is, the torque and velocity data are integrated from time $T_{CROSSOVER}$ to $T_{FINAL}$, where $T_{FINAL}$ is the end time for the deceleration phase, corresponding to the time at which the motion system has decelerated back to the second velocity checkpoint at step 1006 (in the example described above in connection with FIG. 4, $T_{FINAL}$=t7). The results of these deceleration phase integrations for the torque and velocity data are designated as $U_{dec}$ and $V_{dec}$, respectively.

At 1014, the estimated inertia and/or friction coefficient for the motion system is calculated based on the integrals $U_{acc}$, $V_{acc}$, $U_{dec}$, and $V_{dec}$. For example, the estimated inertia and friction coefficient may be calculated based on equations (12) and (13), respectively, or a variation thereof.

Exemplary Networked and Distributed Environments

One of ordinary skill in the art can appreciate that the various embodiments described herein can be implemented in connection with any computer or other client or server device, which can be deployed as part of a computer network or in a distributed computing environment, and can be connected to any kind of data store where media may be found. In this regard, the various embodiments of the video editing system described herein can be implemented in any computer system or environment having any number of memory or storage units (e.g., memory 216 of FIG. 2), and any number of applications and processes occurring across any number of storage units. This includes, but is not limited to, an environment with server computers and client computers deployed in a network environment or a distributed computing environment, having remote or local storage. For example, with reference to FIG. 2, the torque command generator 204, velocity monitoring component 206, inertia component 208, friction coefficient component 210, and interface component 212 can be stored on a single memory 216 associated with a single device, or can be distributed among multiple memories associated with respective multiple devices. Similarly, torque command generator 204, velocity monitoring component 206, inertia component 208, friction coefficient component 210, and interface component 212 can be executed by a single processor 214, or by multiple distributed processors associated with multiple devices.

Distributed computing provides sharing of computer resources and services by communicative exchange among computing devices and systems. These resources and services include the exchange of information, cache storage and disk storage for objects. These resources and services can also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the various embodiments of this disclosure.

Figure 11:
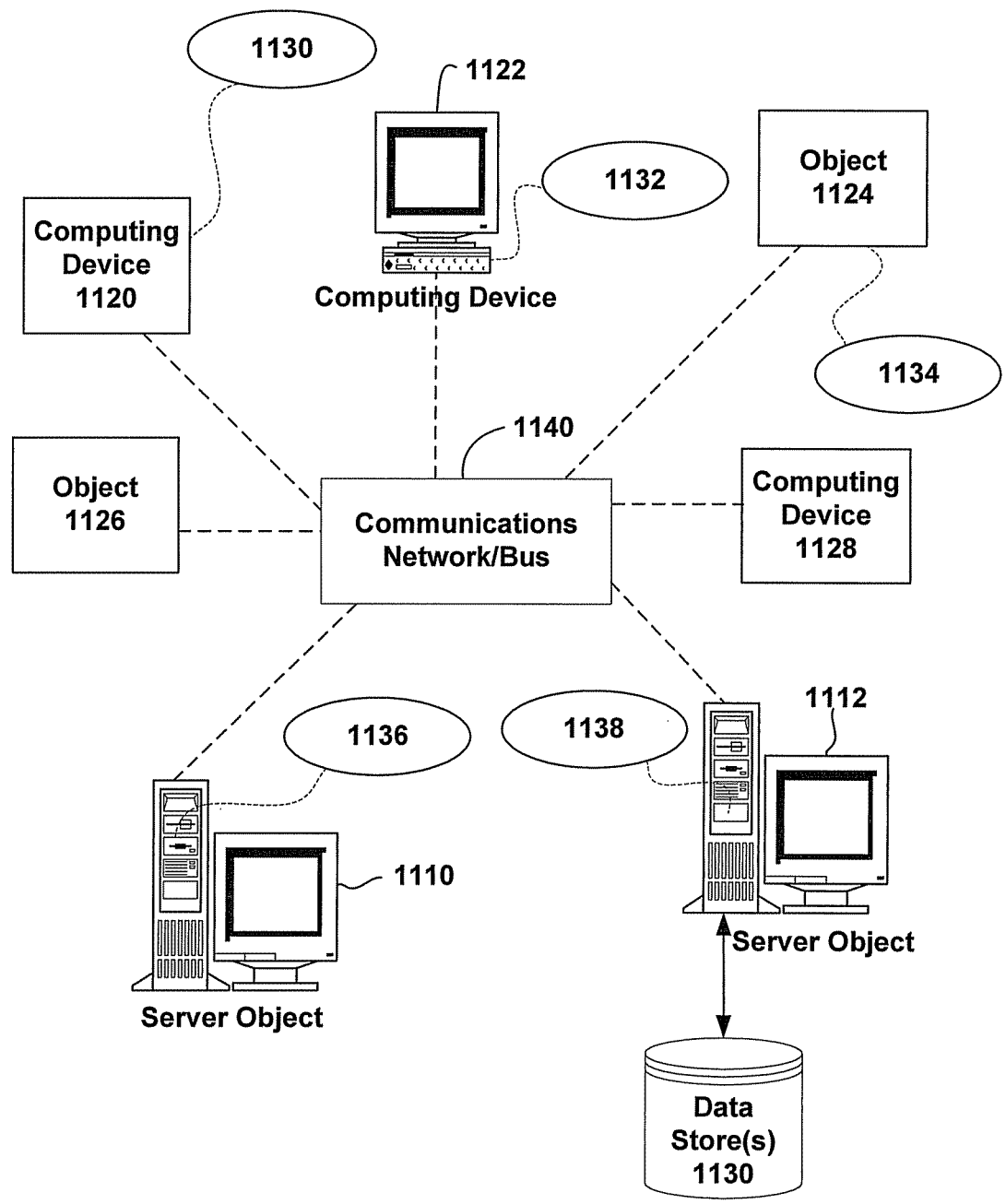
FIG. 11 is a block diagram representing an exemplary networked or distributed computing environment for implementing one or more embodiments described herein.

FIG. 11 provides a schematic diagram of an exemplary networked or distributed computing environment. The distributed computing environment includes computing objects 1110, 1112, etc. and computing objects or devices 1120, 1122, 1124, 1126, 1128, etc., which may include programs, methods, data stores, programmable logic, etc., as represented by applications 1130, 1132, 1134, 1136, 1138. It can be appreciated that computing objects 1110, 1112, etc. and computing objects or devices 1120, 1122, 1124, 1126, 1128, etc. may comprise different devices, such as personal digital assistants (PDAs), audio/video devices, mobile phones, MP3 players, personal computers, laptops, tablets, etc., where embodiments of the inertia estimator described herein may reside on or interact with such devices.

Each computing object 1110, 1112, etc. and computing objects or devices 1120, 1122, 1124, 1126, 1128, etc. can communicate with one or more other computing objects 1110, 1112, etc. and computing objects or devices 1120, 1122, 1124, 1126, 1128, etc. by way of the communications network 1140, either directly or indirectly. Even though illustrated as a single element in FIG. 11, communications network 1140 may comprise other computing objects and computing devices that provide services to the system of FIG. 11, and/or may represent multiple interconnected networks, which are not shown. Each computing object 1110, 1112, etc. or computing objects or devices 1120, 1122, 1124, 1126, 1128, etc. can also contain an application, such as applications 1130, 1132, 1134, 1136, 1138 (e.g., inertia estimator 202 or components thereof), that might make use of an API, or other object, software, firmware and/or hardware, suitable for communication with or implementation of various embodiments of this disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any suitable network infrastructure can be used for exemplary communications made incident to the systems as described in various embodiments herein.

Thus, a host of network topologies and network infrastructures, such as client/server, peer-to-peer, or hybrid architectures, can be utilized. The "client" is a member of a class or group that uses the services of another class or group. A client can be a computer process, e.g., roughly a set of instructions or tasks, that requests a service provided by another program or process. A client process may utilize the requested service without having to "know" all working details about the other program or the service itself.

In a client/server architecture, particularly a networked system, a client can be a computer that accesses shared network resources provided by another computer, e.g., a server. In the illustration of FIG. 11, as a non-limiting example, computing objects or devices 1120, 1122, 1124, 1126, 1128, etc. can be thought of as clients and computing objects 1110, 1112, etc. can be thought of as servers where computing objects 1110, 1112, etc. provide data services, such as receiving data from client computing objects or devices 1120, 1122, 1124, 1126, 1128, etc., storing of data, processing of data, transmitting data to client computing objects or devices 1120, 1122, 1124, 1126, 1128, etc., although any computer can be considered a client, a server, or both, depending on the circumstances. Any of these computing devices may be processing data, or requesting transaction services or tasks that may implicate the techniques for systems as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network/bus 1140 is the Internet, for example, the computing objects 1110, 1112, etc. can be Web servers, file servers, media servers, etc. with which the client computing objects or devices 1120, 1122, 1124, 1126, 1128, etc. communicate via any of a number of known protocols, such as the hypertext transfer protocol (HTTP). Computing objects 1110, 1112, etc. may also serve as client computing objects or devices 1120, 1122, 1124, 1126, 1128, etc., as may be characteristic of a distributed computing environment.

Exemplary Computing Device

Figure 12:
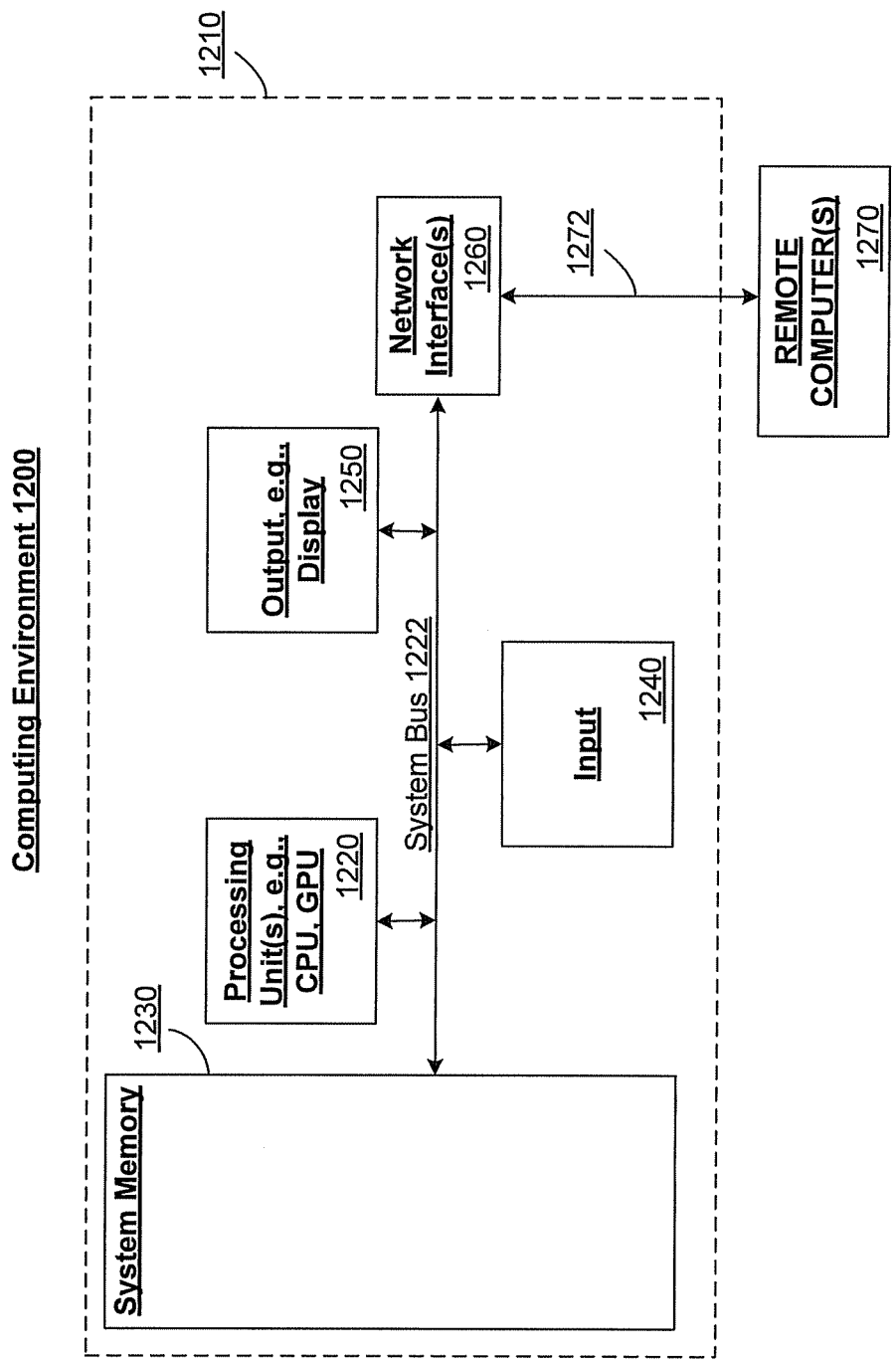
FIG. 12 is a block diagram representing an exemplary computing system or operating environment for implementing one or more embodiments described herein.

As mentioned, advantageously, the techniques described herein can be applied to any suitable device. It is to be understood, therefore, that handheld, portable and other computing devices and computing objects of all kinds are contemplated for use in connection with the various embodiments. Accordingly, the below computer described below in FIG. 12 is but one example of a computing device. Additionally, a suitable server can include one or more aspects of the below computer, such as a media server or other media management server components.

Although not required, embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

FIG. 12 thus illustrates an example of a suitable computing system environment 1200 in which one or aspects of the embodiments described herein can be implemented, although as made clear above, the computing system environment 1200 is only one example of a suitable computing environment and is not intended to suggest any limitation as to scope of use or functionality. Neither is the computing system environment 1200 be interpreted as having any dependency or requirement relating to any one or combination of components illustrated in the exemplary computing system environment 1200.

With reference to FIG. 12, an exemplary computing device for implementing one or more embodiments in the form of a computer 1210 is depicted. Components of computer 1210 may include, but are not limited to, a processing unit 1220, a system memory 1230, and a system bus 1222 that couples various system components including the system memory to the processing unit 1220. Processing unit 1220 may, for example, perform functions associated with processor(s) 214 of inertia estimator 202, while system memory 1230 may perform functions associated with memory 216.

Computer 1210 typically includes a variety of computer readable media and can be any available media that can be accessed by computer 1210. The system memory 1230 may include computer storage media in the form of volatile and/or nonvolatile memory such as read only memory (ROM) and/or random access memory (RAM). By way of example, and not limitation, system memory 1230 may also include an operating system, application programs, other program modules, and program data.

A user can enter commands and information into the computer 1210 through input devices 1240, non-limiting examples of which can include a keyboard, keypad, a pointing device, a mouse, stylus, touchpad, touchscreen, trackball, motion detector, camera, microphone, joystick, game pad, scanner, or any other device that allows the user to interact with computer 1210. A monitor or other type of display device is also connected to the system bus 1222 via an interface, such as output interface 1250. In addition to a monitor, computers can also include other peripheral output devices such as speakers and a printer, which may be connected through output interface 1250. In one or more embodiments, input devices 1240 can provide user input to interface component 212, while output interface 1250 can receive information relating to operations of inertia estimator 202 from interface component 212.

The computer 1210 may operate in a networked or distributed environment using logical connections to one or more other remote computers, such as remote computer 1270. The remote computer 1270 may be a personal computer, a server, a router, a network PC, a peer device or other common network node, or any other remote media consumption or transmission device, and may include any or all of the elements described above relative to the computer 1210. The logical connections depicted in FIG. 12 include a network 1272, such local area network (LAN) or a wide area network (WAN), but may also include other networks/buses e.g., cellular networks.

As mentioned above, while exemplary embodiments have been described in connection with various computing devices and network architectures, the underlying concepts may be applied to any network system and any computing device or system in which it is desirable to publish or consume media in a flexible way.

Also, there are multiple ways to implement the same or similar functionality, e.g., an appropriate API, tool kit, driver code, operating system, control, standalone or downloadable software object, etc. which enables applications and services to take advantage of the techniques described herein. Thus, embodiments herein are contemplated from the standpoint of an API (or other software object), as well as from a software or hardware object that implements one or more aspects described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the aspects disclosed herein are not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Computing devices typically include a variety of media, which can include computer-readable storage media (e.g., memory 216) and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function (e.g., coding and/or decoding); software stored on a computer readable medium; or a combination thereof.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In order to provide for or aid in the numerous inferences described herein (e.g. inferring audio segments), components described herein can examine the entirety or a subset of the data to which it is granted access and can provide for reasoning about or infer states of the system, environment, etc. from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, x=(x1, x2, x3, x4, xn), to a confidence that the input belongs to a class, as by f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

In view of the exemplary systems described above, methodologies that may be implemented in accordance with the described subject matter will be better appreciated with reference to the flowcharts of the various figures (e.g., FIGS. 9 and 10). While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

What is claimed is:

1. A method for estimating parameters of a motion system, comprising:
generating a torque command signal that varies continuously over a time the time range comprising an acceleration phase and a deceleration phase;
measuring velocity data for a motion device representing a velocity of the motion system over the time range in response to the torque command signal; and
determining an inertia of the motion system based on a product of an integral of the velocity data over the acceleration phase and an integral of the torque command signal over the deceleration phase.

2. The method of claim 1, wherein the generating the torque command signal comprises adjusting the torque command signal in accordance with a predefined testing sequence.

3. The method of claim 1, wherein the determining comprises:
integrating the torque command signal and the velocity data over the acceleration phase to yield $U_{acc}$ and $V_{acc}$, respectively;
integrating the torque command signal and the velocity data over the deceleration phase to yield $U_{dec}$ and $V_{dec}$, respectively; and
determining the inertia or as a function of $U_{acc}$, $V_{acc}$, $U_{dec}$, and $V_{dec}$,
where:

$U_{acc} = \int u_{acc}(t)$, $V_{acc} = \int v_{acc}(t)$, $U_{dec} = \int u_{dec}(t)$, $V_{dec} = \int v_{dec}(t)$, $u_{acc}(t)$ is a portion of the torque command signal corresponding to the acceleration phase,
$v_{acc}(t)$ is a portion of the velocity data corresponding to the acceleration phase,
$u_{dec}(t)$ is a portion of the torque command signal corresponding to the deceleration phase, and
$v_{dec}(t)$ is a portion of the velocity data corresponding to the deceleration phase.

4. The method of claim 1, further comprising determining at least one controller gain coefficient for the motion system based on the inertia.

5. The method of claim 2, wherein the adjusting the torque command signal comprises changing at least one of a direction or a rate of change of the torque command signal in response to the velocity of the motion system reaching a predefined velocity checkpoint.

6. The method of claim 3, wherein the determining the inertia comprises determining the inertia according to:

$$J = \frac{U_{dec}V_{acc} - U_{acc}V_{dec}}{\Delta v_{dec}(t)V_{acc} - \Delta v_{acc}(t)V_{dec}},$$

where:
- J is the inertia,
- $\Delta v_{acc}(t)$ is a difference between a velocity of the motion system at an end of the acceleration phase and a velocity of the motion system at a beginning of the acceleration phase, and
- $\Delta v_{dec}(t)$ is a difference between a velocity of the motion system at an end of the deceleration phase and a velocity of the motion system at a beginning of the deceleration phase.

7. The method of claim 3, further comprising:
determining a friction coefficient of the motion system according to:

$$B = \frac{\Delta v_{dec}(t)U_{acc} - \Delta v_{acc}U_{dec}}{\Delta v_{dec}(t)V_{acc} - \Delta v_{acc}(t)V_{dec}},$$

where:
- B is the friction coefficient,
- $\Delta v_{acc}(t)$ is a difference between a velocity of the motion system at an end of the acceleration phase and a velocity of the motion system at a beginning of the acceleration phase, and
- $\Delta v_{dec}(t)$ is a difference between a velocity of the motion system at an end of the deceleration phase and a velocity of the motion system at a beginning of the deceleration phase.

8. The method of claim 4, wherein the determining the at least one controller gain coefficient comprises determining the at least one controller gain coefficient further based on a manually adjustable control system bandwidth.

9. A system for estimating mechanical parameters of a motion system, comprising: a memory;
a processor configured to execute computer-executable components stored on the memory, the computer-executable components comprising:
a torque command generator configured to generate a torque command signal that varies continuously over time during a testing sequence, the testing sequence comprising an acceleration phase and a deceleration phase;
a velocity monitoring component configured to obtain velocity data representing a velocity of a motion system over time in response to the torque command signal; and
an inertia component configured to estimate an inertia of the motion system based on a product of an integral of the velocity data over the acceleration phase and an integral of the torque command signal over the deceleration phase.

10. The system of claim 9, wherein the torque command generator is further configured to control the torque command signal in accordance with a torque function u(t), where U(t) is based on a set of predefined instructions associated with respective phases of the testing sequence.

11. The system of claim 9, wherein the inertia component is further configured to estimate the inertia as a function of $U_{acc}$, $V_{acc}$, $U_{dec}$, and $V_{dec}$,
where:

$U_{acc} = \int u_{acc}(t)$, $V_{acc} = \int v_{acc}(t)$, $U_{dec} = \int u_{dec}(t)$, $V_{dec} = \int v_{dec}(t)$, $u_{acc}(t)$ is a portion of the torque command signal corresponding to the acceleration phase of the testing sequence, $v_{acc}(t)$ is a portion of the velocity data corresponding to the acceleration phase, $u_{dec}(t)$ is a portion of the torque command signal corresponding to the deceleration phase of the testing sequence, and $v_{dec}(t)$ is a portion of the velocity data corresponding to the deceleration phase.

12. The system of claim 9, further comprising an interface component configured to receive input specifying at least one of a limiting value for the torque command signal or velocity checkpoint used by the torque command generator to control the torque command signal.

13. The system of claim 9, further comprising a tuning component configured to generate at least one controller gain coefficient as a function of the inertia.

14. The system of claim 9, further comprising a friction coefficient component configured to estimate a friction coefficient of the motion system based on the torque command signal and the velocity data.

15. The system of claim 10, wherein the respective phases are triggered in response to the velocity of the motion system reaching respective defined velocity checkpoint values.

16. The system of claim 11, wherein the inertia component is further configured to estimate the inertia based on:

$$J = \frac{U_{dec}V_{acc} - U_{acc}V_{dec}}{\Delta v_{dec}(t)V_{acc} - \Delta v_{acc}(t)V_{dec}},$$

where:
- J is the inertia,
- $\Delta v_{acc}(t)$ is a difference between a velocity of the motion system at an end of the acceleration phase and a velocity of the motion system at a beginning of the acceleration phase, and
- $\Delta v_{dec}(t)$ is a difference between a velocity of the motion system at an end of the deceleration phase and a velocity of the motion system at a beginning of the deceleration phase.

17. The system of claim 11, further comprising a friction coefficient component configured to estimate a friction coefficient of the motion system based on:

$$B = \frac{\Delta v_{dec}(t)U_{acc} - \Delta v_{acc}U_{dec}}{\Delta v_{dec}(t)V_{acc} - \Delta v_{acc}(t)V_{dec}},$$

where,
- B is the friction coefficient,
- $\Delta v_{acc}(t)$ is a difference between a velocity of the motion system at an end of the acceleration phase and a velocity of the motion system at a beginning of the acceleration phase, and
- $\Delta v_{dec}(t)$ is a difference between a velocity of the motion system at an end of the deceleration phase and a velocity of the motion system at a beginning of the deceleration phase.

18. A non-transitory computer-readable medium having stored thereon computer-executable instructions that, in response to execution, cause a computer system to perform operations, comprising:

generating a torque command signal that varies continuously over a time interval comprising an acceleration phase and a deceleration phase;

obtaining velocity data from a controlled mechanical system; and estimating an inertia of the controlled mechanical system based on a product of an integral of the velocity data over the acceleration phase and an integral of the torque command signal over the deceleration phase.

19. The non-transitory computer-readable medium of claim 18, wherein the estimating comprises:

integrating the torque command signal and the velocity data over the acceleration phase of the time interval to yield $U_{acc}$ and $V_{acc}$, respectively;

integrating the torque command signal and the velocity data over the deceleration phase of the time interval to yield $U_{dec}$ and $V_{dec}$, respectively; and estimating the inertia as a function of $U_{acc}$, $V_{acc}$, $U_{dec}$, and $V_{dec}$, where:

$U_{acc} = \int u_{acc}(t)$, $V_{acc} = \int v_{acc}(t)$, $U_{dec} = \int u_{dec}(t)$, $V_{dec} = \int v_{dec}(t)$, $u_{acc}(t)$ is a portion of torque command signal corresponding to the acceleration phase, $v_{acc}(t)$ is a portion of the velocity data corresponding to the acceleration phase, $u_{dec}(t)$ is a portion of the torque command signal corresponding to the deceleration phase, and $v_{dec}(t)$ is a portion of the velocity data corresponding to the deceleration phase.

20. The non-transitory computer-readable medium of claim 19, wherein the operations further comprise estimating of the controlled mechanical system as a function of $U_{acc}$, $V_{acc}$, $U_{dec}$ and $V_{dec}$.

* * * * *